US006857675B2

United States Patent
Kurachi et al.

(10) Patent No.: US 6,857,675 B2
(45) Date of Patent: Feb. 22, 2005

(54) DAMPER UNIT AND GLOVE BOX DEVICE USING THE SAME

(75) Inventors: Katsuhito Kurachi, Nisshin (JP); Shunsuke Okabayashi, Toyota (JP); Ken Hayashi, Aichi-ken (JP); Hiroyuki Hayashi, Nagoya (JP); Mikihiro Amano, Toyota (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/667,437

(22) Filed: Sep. 23, 2003

(65) Prior Publication Data

US 2004/0189035 A1 Sep. 30, 2004

(30) Foreign Application Priority Data

Nov. 25, 2002 (JP) .......................... 2002-340904

(51) Int. Cl.$^7$ ............... B60R 7/06; E05F 1/10
(52) U.S. Cl. ................ 296/37.12; 49/386; 224/483
(58) Field of Search ............ 296/37.12, 37.8, 296/70, 50, 56, 57.1, 146.4; 224/483, 282; 475/346, 331; 49/386; 73/430

(56) References Cited

U.S. PATENT DOCUMENTS

| | | | | | |
|---|---|---|---|---|---|
| 4,688,695 | A | * | 8/1987 | Hirohata | 49/364 |
| 5,809,697 | A | * | 9/1998 | Chen | 49/386 |
| 6,062,623 | A | * | 5/2000 | Lemmen | 296/37.8 |
| 6,185,868 | B1 | * | 2/2001 | Kato | 49/339 |
| 6,523,788 | B2 | * | 2/2003 | Zander | 246/111 |
| 6,749,242 | B2 | * | 6/2004 | Park | 296/37.12 |
| 2003/0080131 | A1 | * | 5/2003 | Fukuo | 220/264 |

FOREIGN PATENT DOCUMENTS

| | | | | |
|---|---|---|---|---|
| EP | 562284 A1 | * | 9/1993 | 296/37.12 |
| JP | 9-317317 | | 12/1997 | |

* cited by examiner

Primary Examiner—O. Glenn Dayoan
Assistant Examiner—G. Blankenship
(74) Attorney, Agent, or Firm—Manabu Kanesaka

(57) ABSTRACT

A damper unit includes a gear having a core member projecting at a shaft core portion thereof and rotatably housed in a case, a string wound around the core member, a rotary damper engaging the gear for damping a rotational force of the gear, and a spring. One end of the spring is fixed to the case and the other end thereof is fixed to the core member so that an elastic force is accumulated when the string is pulled out.

7 Claims, 6 Drawing Sheets

DAMPER UNIT AND GLOVE BOX DEVICE USING THE SAME

BACKGROUND OF THE INVENTION AND RELATED ART STATEMENT

The invention relates to a damper unit and a glove box device using the damper unit.

An automatic pull-out device 102 of a pull-out member 100 shown in FIGS. 6 and 7 includes a damper unit 104 (for example, as disclosed in Patent reference No.1). The damper unit 104 includes a unit case 106; a locking device 108 housed in the unit case 106; a low torque spring 110 for urging the pull-out member 100 in a pulling out direction; a winding reel 112 driven in a winding direction by the low torque spring 110; a long pulling rope 114 with one end thereof fixed to the winding reel 112; a rotary damper 116 for damping a rotation of the winding reel 112 at least in the winding direction; and a clutch mechanism 118 disposed between the winding reel 112 and the rotary damper 116 for shutting off transmission of the rotational force of the winding reel 112 in the pulling out direction.

In the damper unit 104, when the pull-out member 100 which was pulled out is pushed into the housing 120, the pulling rope 114 is gradually pulled out from the unit case 106, and a winding reel 112 is rotated in the pulling out direction (counter clockwise direction).

As described above, when the winding reel 112 is rotated in the counter clockwise direction, a second drum 122 integrally formed with the winding reel 112 is also rotated in the same direction, so that the low torque spring 110 wound around a first drum 124 in the counter clockwise direction is wound around the second drum 122 in the same direction to accumulate an elastic force. Then, when the pull-out member 100 is pushed into a housing position of the housing 120, the pull-out member 100 is locked at the housing position against the restoring force of the low torque spring 110 by the locking device 108.

On the other hand, when the pull-out member 100 is pushed in, since the winding reel 112 is rotated in the counter clockwise direction, a first collar 126 is also rotated along with a projection shaft 128. However, since a clutch spring 130 wound in the clockwise direction is rotated in a direction to unwind the winding of the clutch spring 130, an inner diameter of the clutch spring 130 is enlarged, so that slippage takes place between an outer peripheral surface of the second collar 132 and an inner surface of the clutch spring 130 and an output gear 134 does not rotate.

Therefore, even when the winding reel 112 is rotated in the counter clockwise direction, since an input gear 136 of the rotary damper 116 is not rotated, the damping force of the rotary damper 116 does not act, so that a force required for pushing in the pull-out member 100 is reduced for that amount.

In this state, when an opening-closing door (not shown) rotatably supported by a forward lower edge portion of the housing 120, and positioned under the pull-out member 100 in an opened state and in front of the pull-out member 100 in a closed state, is closed, the opening-closing door abuts against a projection 138, and the pull-out member 100 is pushed into the casing 120 through the projection 138. At this time, a releasing mechanism of the locking device 108 releases the locked state, and the pull-out member 100 is pulled out in front of the casing 120 through the restoring force of the low torque spring 110. However, the pull-out member 100 stops in a state that it abuts against the opening-closing door.

Next, when a pivoted door is opened, the pull-out member 100 is automatically pulled out. In other words, the low torque spring 110 is wound around the first drum 124 again by the restoring force accumulated in the low torque spring 110 wound around the second drum 122 to thereby rotate the second drum 122 in the clockwise direction.

Accordingly, a rotational force for driving in the winding direction, i.e. clockwise direction, is generated on the winding reel 112 to thereby gradually wind up the pulling rope 114 which was pulled out. As described above, when the pulling rope 114 is wound up, the pull-out member 100 is pulled out through the opening of the casing 120 by the pulling force of the pulling rope 114.

On the other hand, when the winding reel 112 is rotated in the clockwise direction, the clutch spring 130 is wound up, and outer peripheries of the first collar 126 and the second collar 132 are tightened up. Thus, the output gear 134 is rotated together with the winding reel 112, and the input gear 136 of the rotary damper 116 engaging the output gear 134 is rotated, so that a damping force due to the oil viscous resistance in the rotary damper 116 acts.

Therefore, although the winding reel 112 tries to rotate vigorously by the restoring force of the low torque spring 110, the rotational force is damped by the rotary damper 116 to thereby rotate slowly, so that the pull-out member 100 is pulled out quietly and slowly.

As described hereinabove, in the damper unit 104, the pull-out member 100 can be pushed in with a small force and automatically pulled out quietly and slowly. However, a large number of parts are required, resulting in poor assembling workability and a high cost.

Patent Reference No. 1; Japanese Utility Model Publication No. 04-46595 (refer to pages 6 to 11, FIG. 7)

In view of the above problems, an object of the present invention is to provide a damper unit and a glove box device using the damper unit with simple structures at a low cost.

Further objects and advantages of the invention will be apparent from the following description of the invention.

SUMMARY OF THE INVENTION

According to the first aspect of the invention, a damper unit includes a gear having a core member projecting at a shaft core portion thereof and rotatably housed in a case; a string wound around the core member; a rotary damper engaging the gear for damping a rotational force of the gear; and a spring with one end fixed to the case and the other end fixed to the core member so that an elastic force is accumulated when the string is pulled out.

In the first aspect of the invention, the core member is provided at the shaft core portion of the gear, and the string is wound around the core member and fixed thereto, so that the gear, string and spring are coaxially disposed. Therefore, there is no gap in axes among the gear, string and spring, so that the damper unit can be assembled with a high precision.

Also, when the string is pulled out, the gear around which the string is wound is rotated. At this time, the rotary damper engaging the gear damps the rotational force of the gear, so that the string is not vigorously pulled out.

Further, when the gear is rotated in the direction that the string is pulled out, the elastic force is accumulated in the spring in accordance with the rotation of the gear. Therefore, when the pulled-out string is returned, the string can be wound around the core member by the restoring force of the spring.

According to the second aspect of the invention, the rotary damper is a one-way damper so that the rotational force of the gear can be damped when the gear is rotated in the direction in which the string is pulled out. Accordingly, when the string is pulled out, the string is pulled out slowly due to the one-way damper. When the string is returned, the one-way damper does not work, and the string is returned smoothly.

According to the third aspect of the invention, the core member is formed in a cylindrical shape, and the string is wound around an outer peripheral surface thereof. Also, the spring is wound around a boss projected from the case and positioned at an inside of the cylindrical portion in a state that one end of the spring is fixed to the boss and the other end thereof is fixed to an inner peripheral surface of the cylindrical portion.

With this configuration, as compared with a case that, for example, the core portion is formed in a cylindrical portion and the string and the spring are wound around the outer peripheral surface of the cylindrical portion, it is possible to shorten a length of the core portion. Therefore, it is possible to reduce a wall thickness of the damper unit and make the damper unit compact.

According to the fourth aspect of the invention, the spring is formed in a spiral spring. When the string is pulled out, the cylindrical portion is rotated to allow the spiral spring to tighten the boss. Therefore, when the string is pulled out, the elastic force is accumulated in the spiral spring. In addition, the spiral spring tightens the boss to generate the sliding friction between the spiral spring and the outer peripheral surface of the boss to thereby obtain the damper effect by the spiral spring.

According to the fifth aspect of the invention, a guiding member for guiding the string is provided at an exit portion through which the string is pulled out from the case. Thus, when the string is pulled out from the case, it is possible to adjust a direction of the string through the guiding member, thereby making an attaching direction of the damper unit flexible.

According to the sixth aspect of the invention, the guiding member is formed of a roller. Thus, even in a case that a free end of the string is fixed to the opening-closing member rotating around a pivot, the opening-closing member can be smoothly opened. Also, as an opening angle of the opening-closing member increases, a winding-up angle of the string winding up the roller member increases. As a result, the sliding friction increases to thereby obtain the damper effect by the string.

According to the seventh aspect of the invention, the damper unit in any one of the first to sixth aspects is fixed to one of the glove box main portion and the car body, and one end of the string is fixed to the other of the glove box main portion and the car body.

With this configuration, when the glove box is opened, the damping force by the rotary damper acts, and the glove box main portion is opened slowly to thereby obtain high quality feeling. Also, when the glove box is closed, the damping force by the rotary damper does not act due to the one-way damper. Thus, the glove box can be closed with a small force.

DETAILED DESCRIPTION OF PREFERRED EMBODIMENTS

Figure 1:
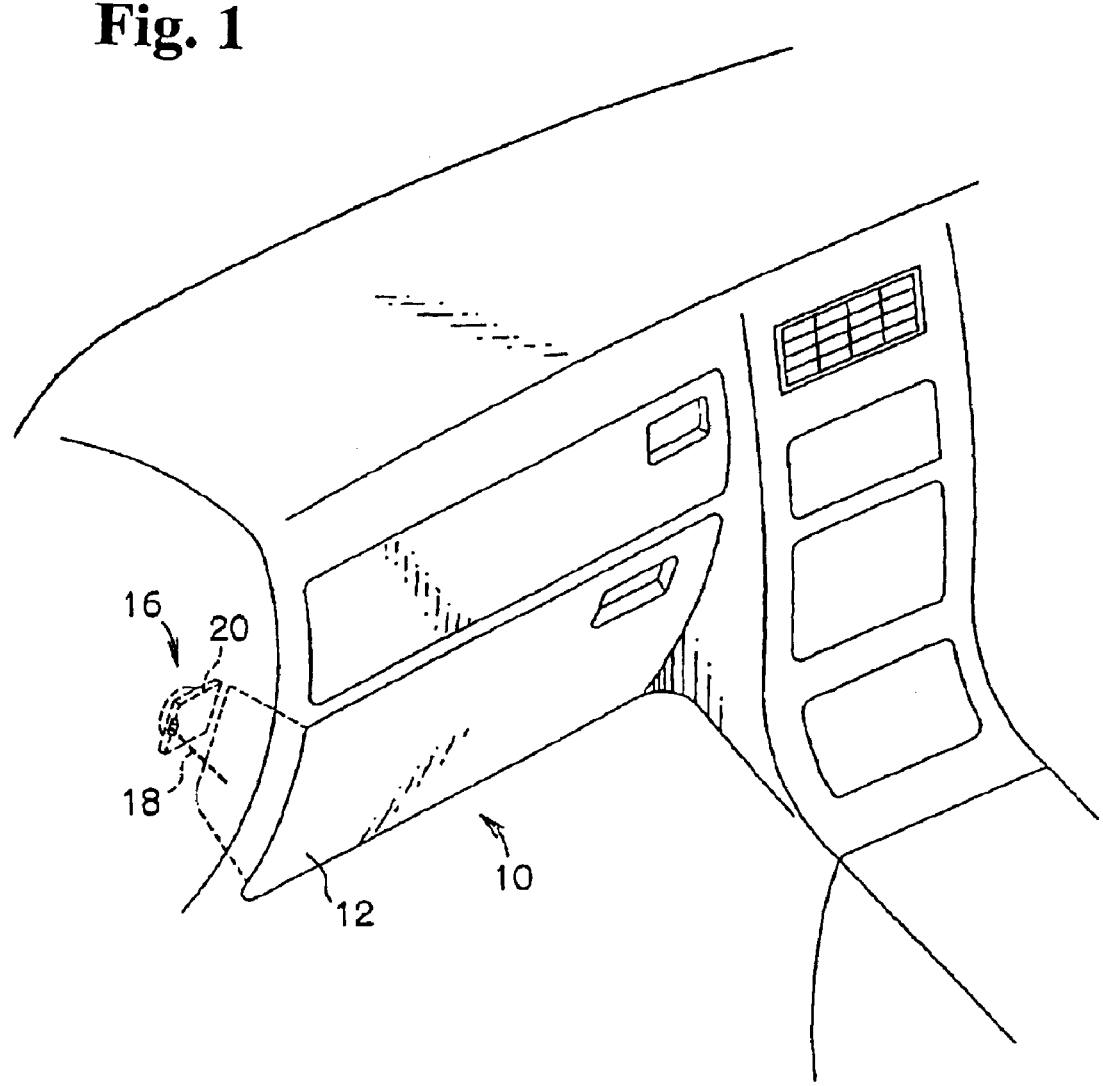
FIG. 1 is an explanatory view showing a glove box to which a damper unit of an embodiment of the present invention is applied.

A glove box 10 and the like of a vehicle as shown in FIG. 1 is provided with a damper mechanism so that a glove box main portion 12 is not rapidly opened or an unpleasant percussive noise and the like is not generated upon opening and closing. A case 20 constituting a damper unit 16 is disposed on a car-body side, and a string 18 constituting the damper unit 16 is fixed to the glove box main portion 12 side.

Figure 2:
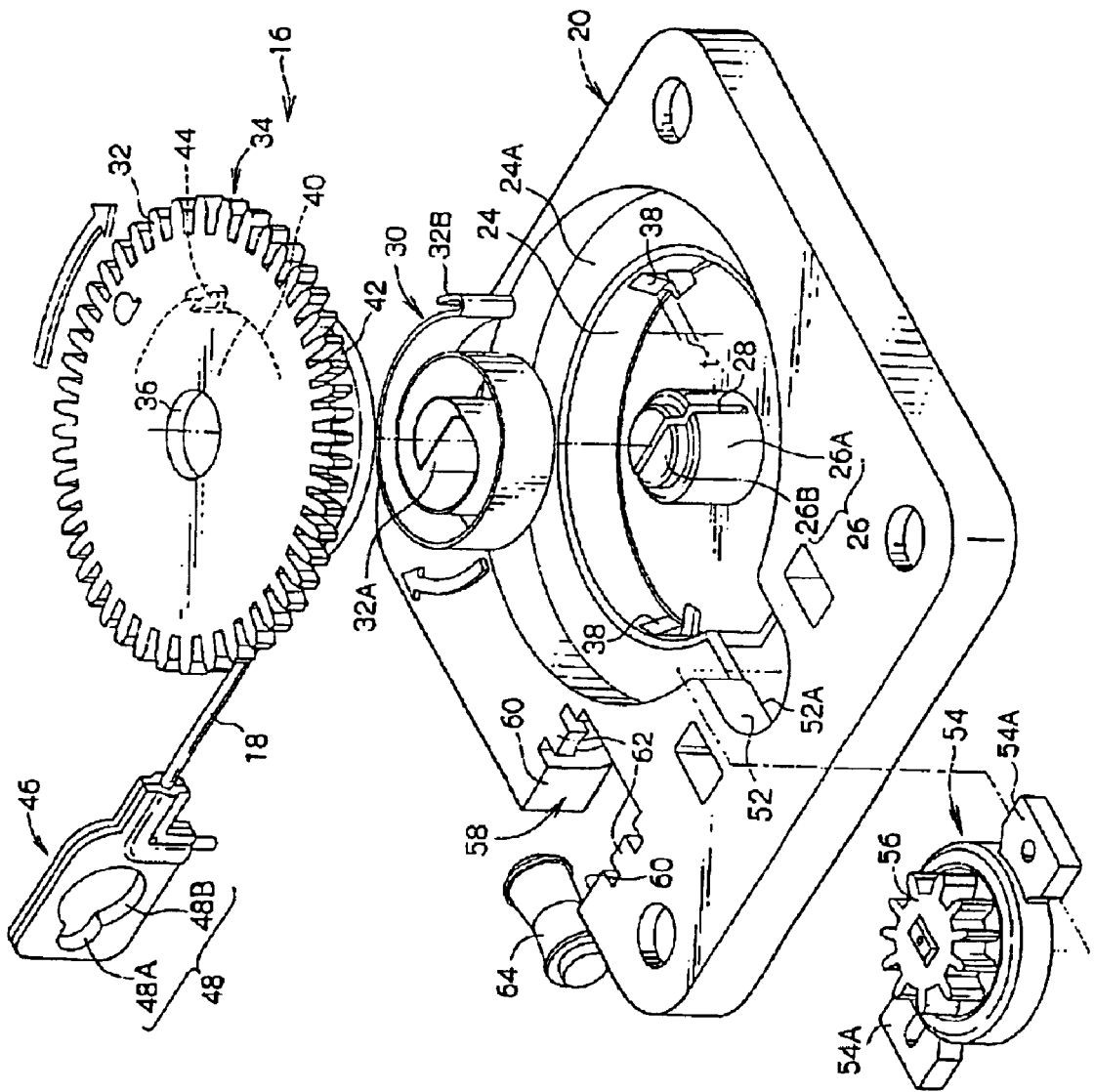
FIG. 2 is an exploded perspective view of the damper unit according to the embodiment of the invention.
Figure 3:
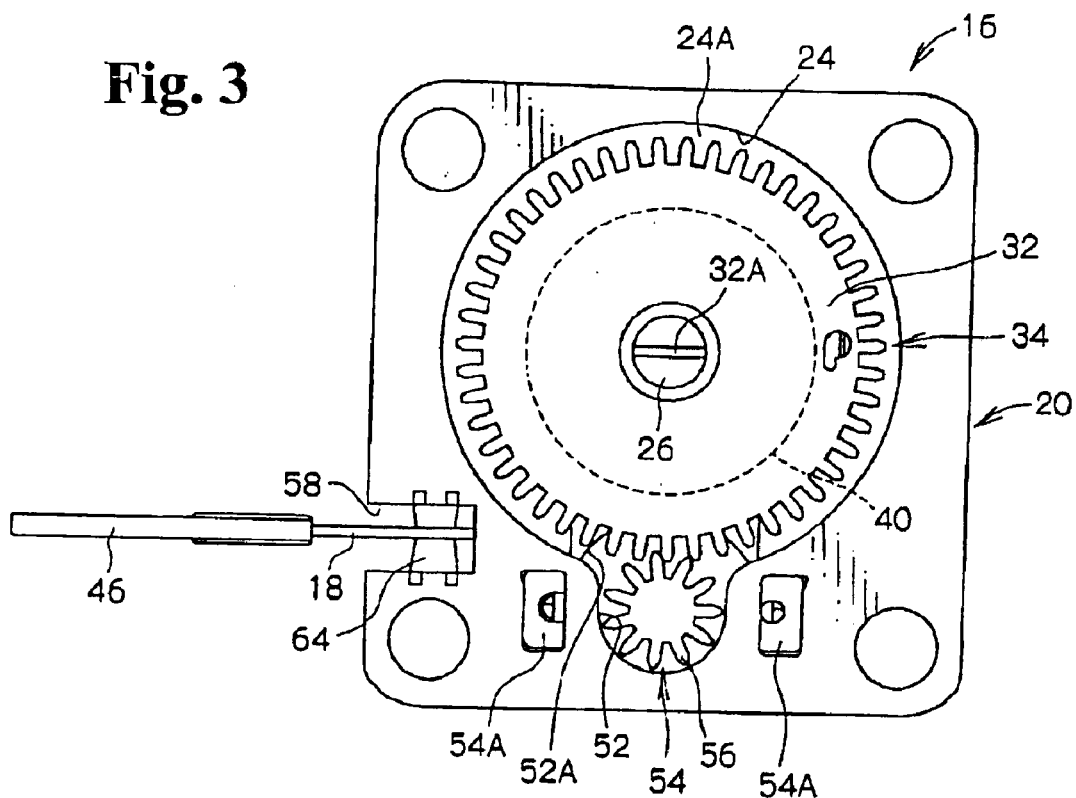
FIG. 3 is a plan view of the damper unit according to the embodiment of the invention.
Figure 4:
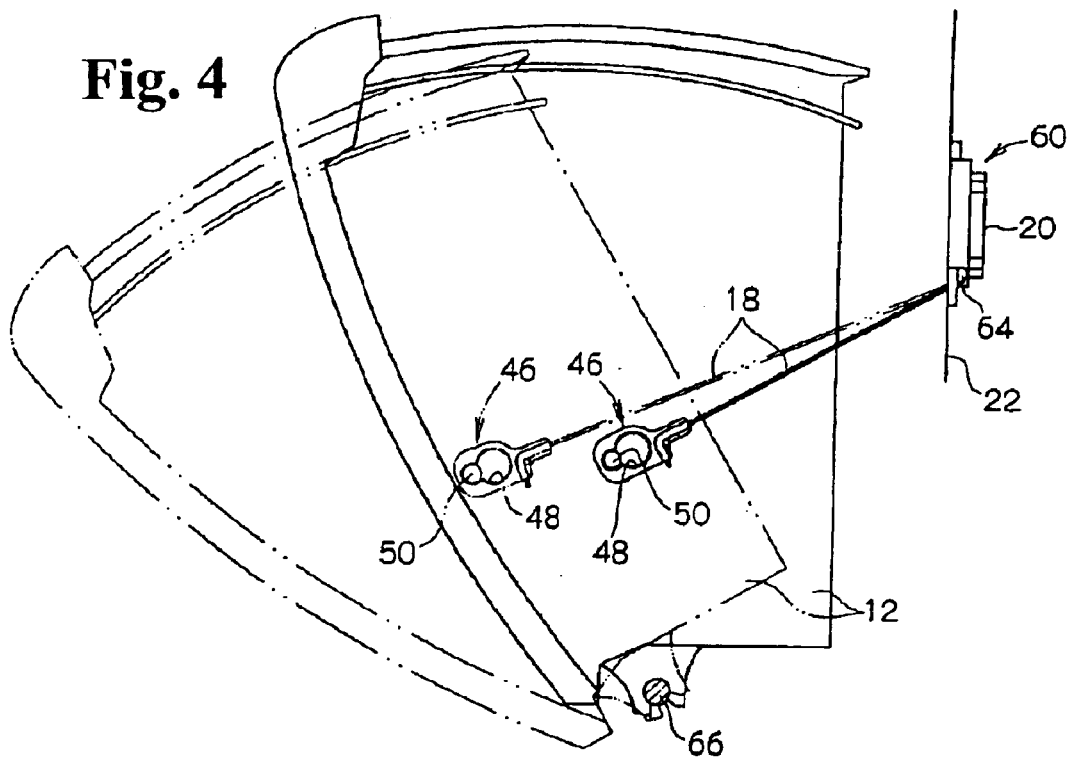
FIG. 4 is a side sectional view showing a movement of the glove box to which the damper unit of the embodiment of the invention is applied.

As shown in FIGS. 2 and 3, a substantially rectangular case 20 is provided to the damper unit 16 and fixed to an attaching seat 22 provided on the vehicle body (refer to FIG. 4). A receiving depression 24 is provided at the center portion of the case 20, and a boss 26 is formed at the center portion of the receiving depression 24.

The boss 26 includes a larger diameter portion 26A and a smaller diameter portion 26B. A notch portion 28 is formed to extend from the smaller diameter portion 26B to a base side of the larger diameter portion 26A to divide the boss into two parts in an axial direction. One end 32A positioned at the center of a spiral spring 30 can be fitted into the notch portion 28, and the one end of the spiral spring 30 is fixed to the larger diameter portion 26A. The spiral spring 30 is loosely wound several times around an outer peripheral surface of the larger diameter portion 26A in a clockwise direction (in an arrow direction).

Also, a gear member 34 provided with a gear portion 32 can engage the boss 26. A shaft core portion of the gear member 34 is provided with a through-hole 36 for engaging the smaller diameter portion 26B constituting the boss 26. The gear member 34 is rotatably housed in the receiving depression 24 in a state that the smaller diameter portion 26B engages the through-hole 36.

An annular platform 24A having a diameter larger than an inner diameter of the receiving depression 24 is formed on a peripheral edge portion of the receiving depression 24 to place the gear portion 32 thereon. Also, an inner peripheral surface of the receiving depression 24 is provided with three claw portions with an equal space therebetween and having a space t (refer FIG. 5) from a bottom surface of the receiving depression 24 so as to elastically expand outwardly along a radial direction.

On the other hand, a cylindrical core member 40 with a diameter smaller than the inner diameter of the receiving depression 24 projects at an outside of the through-hole 36. An annular flange portion 42 extends from the forward end of the core member 40 parallel to the gear portion 32. An outer diameter of the flange portion 42 is slightly smaller than the inner diameter of the receiving depression 24. A wall thickness of the flange portion 42 is slightly smaller than the space t provided between the claw portion 38 and the bottom surface of the receiving depression 24.

Accordingly, when the flange portion 42 is inserted into the receiving depression 24, the claw portions 38 elastically deform outwardly, and when the flange portion 42 is disposed in the space t, the claw portions 38 restore. Thus, the gear member 34 is prevented from coming off through the flange portion 42, and the through-hole 36 of the gear member 34 engages the smaller diameter portion 26B of the boss 26 to thereby rotatably support the gear member 34 in the receiving depression 24.

An engaging member 44 extending from the gear portion 32 side to the flange portion 42 side is formed on the core member 40 of the gear member 34 at a position slightly away from the inner peripheral surface thereof. The other end 32B of the spiral spring 30 with the one end 32A fixed to the boss 26 provided at the center portion of the receiving depression 24 engages the engaging member 44.

One end of a string 18 is fixed to an outer peripheral surface of the core member 40 to be wound therearound in the clockwise direction (an arrow direction). When the string 18 is pulled out, the gear member 34 is rotated in the clockwise direction. As a result, the spiral spring 30 is tightened to reduce a diameter of the spiral spring 30, so that an outer peripheral surface of the larger diameter portion 26A of the boss 26 is tightened and an elastic force is accumulated.

On the other hand, the other end of the string 18 is fixed to an engaging attachment 46 formed in a flat plate shape. A long hole portion 48 formed in a small-diameter hole 48A and a large-diameter hole 48B continuously connected is provided at the center portion of the engaging attachment 46.

Figure 5:
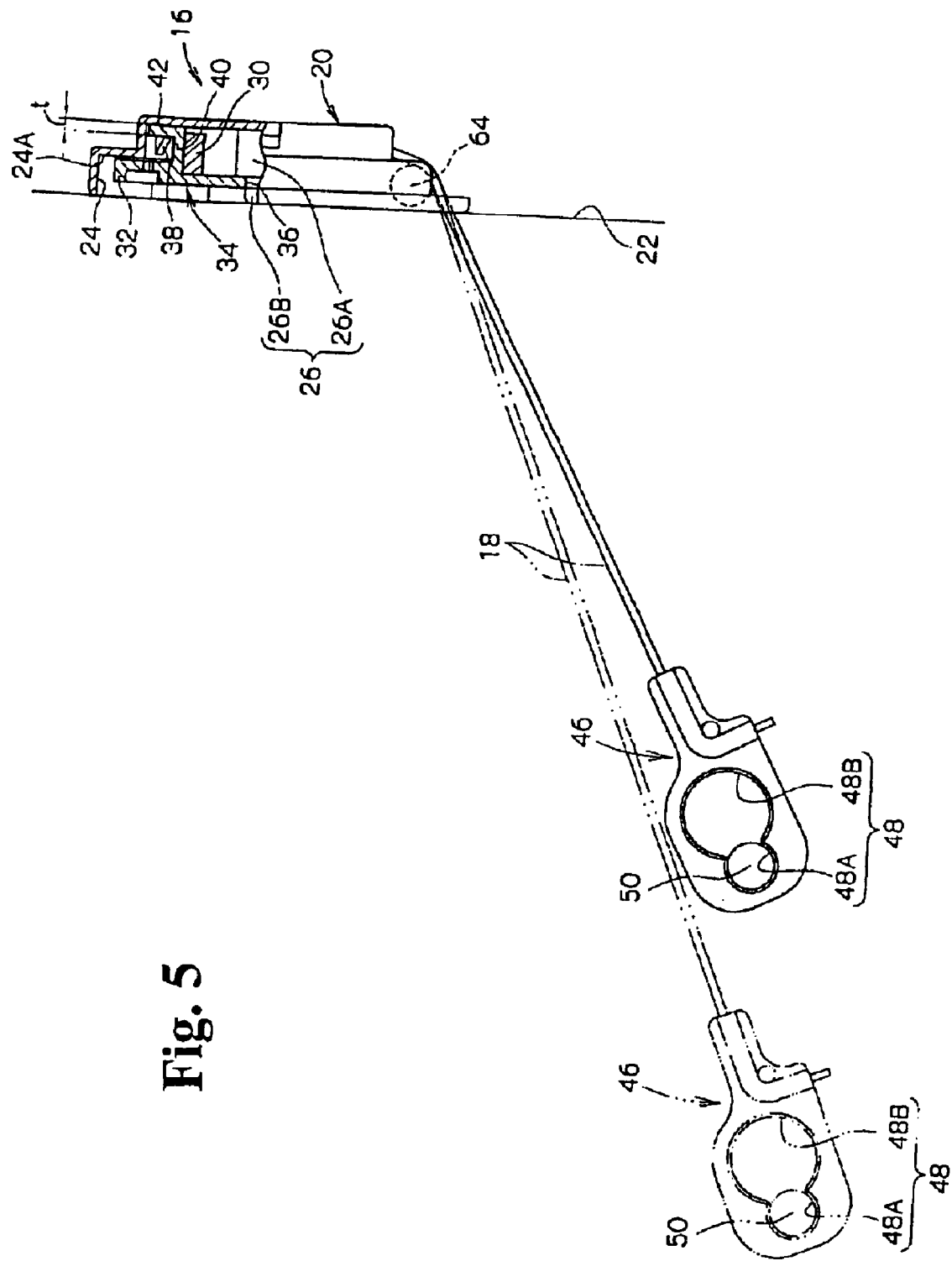
FIG. 5 is a partial sectional view showing the movement of the damper unit according to the embodiment of the invention.
Figure 6:
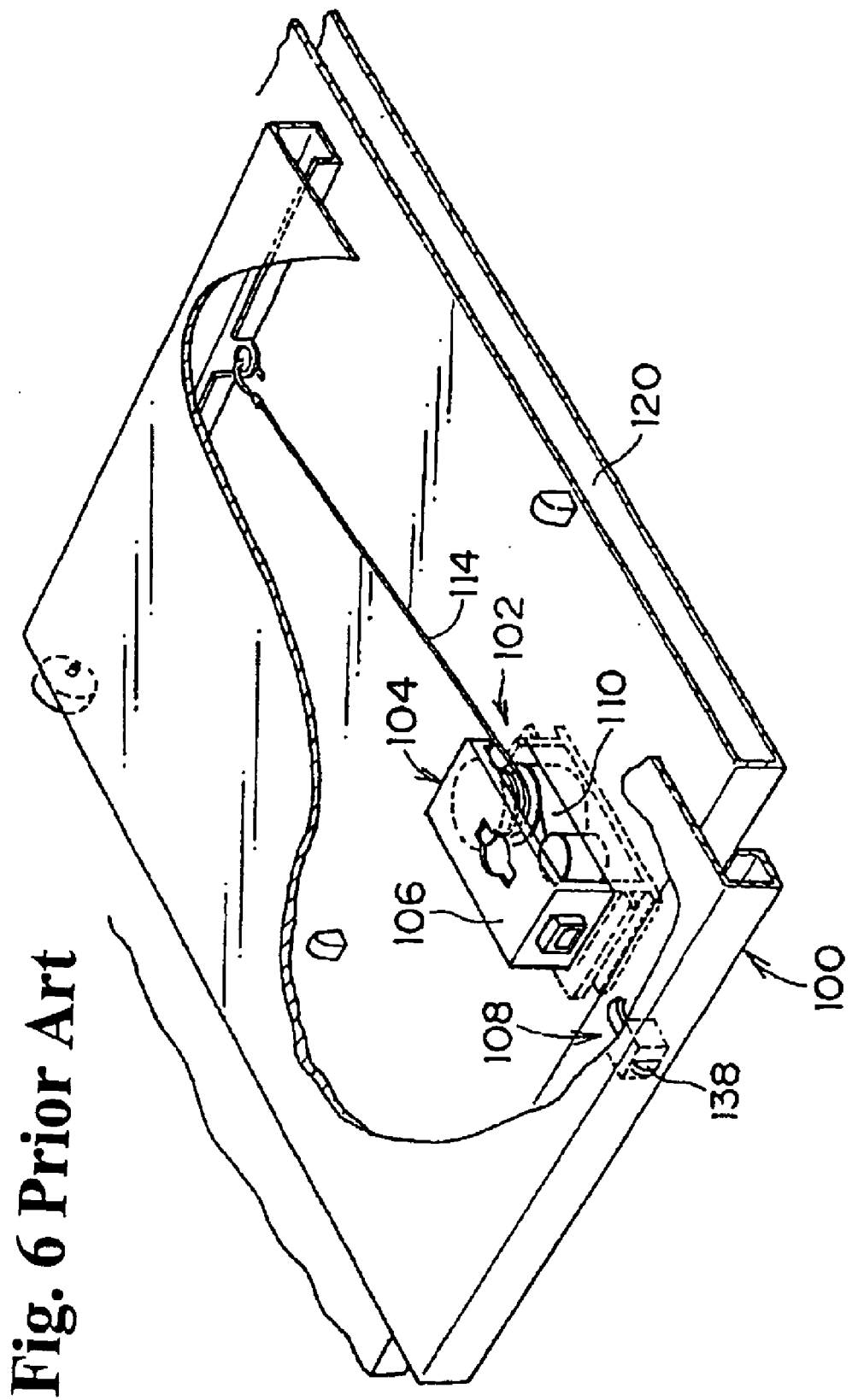
FIG. 6 is a perspective view showing a conventional damper unit and a pull-out member to which the conventional damper unit is applied.
Figure 7:
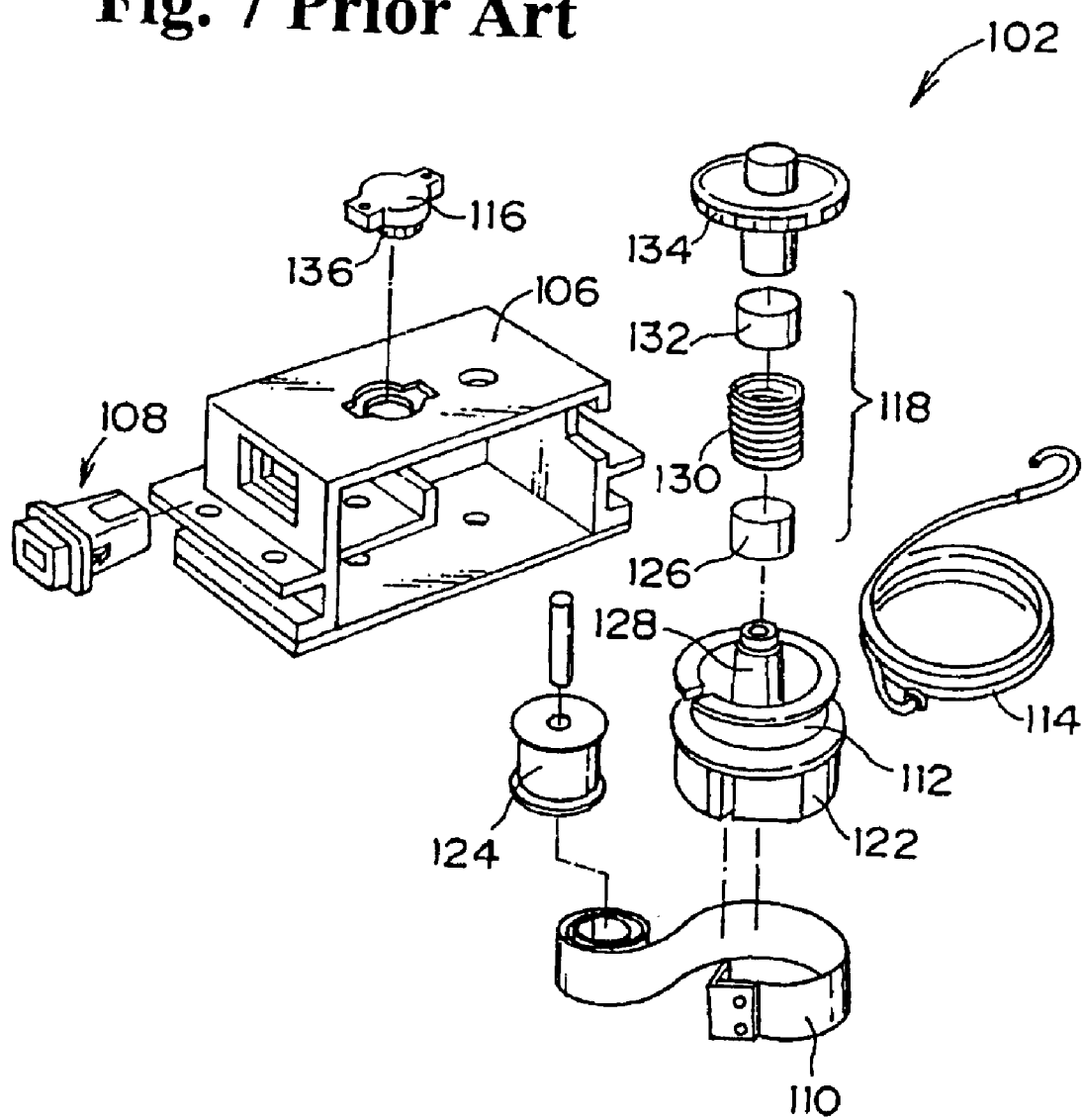
FIG. 7 is an exploded perspective view showing the conventional damper unit.

As shown in FIGS. 4 and 5, the small-diameter hole 48A is structured to fit in an engaging portion 50 provided on a sidewall of the glove box main portion 12. After the engaging portion 50 is inserted into the large-diameter hole 48B, the long hole portion 48 is moved along the engaging portion 50 to allow the engaging portion 50 to fit in the small-diameter hole 48A.

With this configuration, the engaging attachment 46 is fixed to the sidewall of the glove box main portion 12. When the glove box main portion 12 is opened, the string 18 is pulled out from the interior of the case 20 through the engaging attachment 46.

Incidentally, as shown in FIG. 2, a receiving portion 52 is provided in the receiving depression 24 along the radial direction, so that a rotary damper 54 is received therein for damping the rotational force of the gear portion 56 by means of the viscous resistance of oil such as silicone oil.

A hole portion 52A is formed at the bottom surface of the receiving portion 52. A platform (not shown) is formed on a back surface of the case with the hole portion 52A therebetween. A pair of fixing members 54A provided to the rotary damper 54 is fixed to the platform in a state that they are placed thereon, and the rotary damper 54 is disposed in the receiving portion 52 through the fixing members 54A. At this time, the rotary damper 54 is arranged at a height at which the gear portion 56 constituting the rotary damper 54 engages the gear portion 32 of the gear member 34.

On the other hand, a notch portion 58 is formed on an outer wall of the case 20 positioned in the vicinity of the hole portion 52A, and a pair of holding walls 60 is provided in the notch portion 58. The holding walls 60 are provided with claws 62, so that a roller member 64 engages the claws 62 to be fixed to the holding walls 60.

Also, the string 18 wound around the core member 40 of the gear member 34 can pass through the hole portion 52A, and the string 18 passing through the hole portion 52A is wound around the roller member 64.

An operation of the damper unit according to the embodiment of the invention will be explained next.

When a locking device formed of a latch mechanism and the like is released and the glove box main portion 12 is opened as shown in FIGS. 2, 4 and 5, the glove box main portion 12 is guided with a guide rail (not shown) disposed on the car body by its own weight to be opened, and abuts against a stopper (not shown) and stops.

Incidentally, through the opening of the glove box main portion 12, the string 18 is pulled out from the case 20 constituting the damper unit 16 through the engaging attachment 46 engaging the sidewall of the glove box main portion 12.

Since the string 18 is fixed to the core member 40 of the gear member 34 and wound around the outer peripheral surface of the core member 40 in the clockwise direction, the gear member 34 is rotated in the clockwise direction through the pull-out of the string 18, and the gear portion 56 engaging the gear portion 32 of the gear member 34 is rotated.

As described above, by rotating the gear portion 56 of the rotary damper 54 through the gear portion 32 of the gear member 34, the damping force by the rotary damper 54 acts and the rotational force of the gear member 34 is damped.

Therefore, the string 18 is not drawn out vigorously, in other word, the glove box main portion 12 is opened slowly through the damping force of the rotary damper 54 to thereby provide high quality feeling of the glove box 10.

Also, the spiral spring 30 wound in the clockwise direction around the boss 26 projected from the center portion of the receiving depression 24 of the case 20 is wound up through the rotation of the gear member 34 in the clockwise direction, so that the diameter thereof is reduced to thereby tighten the outer peripheral surface of the boss 26.

As described above, when the string 18 is pulled out, since the spiral spring 30 tightens the outer peripheral surface of the boss 26, the sliding friction is generated between the spiral spring 30 and the outer peripheral surface of the boss 26 to thereby damp the rotational force of the gear member 34 and obtain the damper effect by the spiral spring 30.

Further, the through-hole 36 is provided at the shaft core portion of the gear member 34 and engages the small-diameter portion 26B of the boss 26 projecting from the center portion of the receiving depression 24, so that the gear member 34 is rotatably supported. Also, the cylindrical core member 40 is provided at the outside of the through-hole 36, and the string 18 is wound around the outer peripheral surface of the core member 40. The spiral spring 30 is also wound around the outer peripheral surface of the boss 26 in the core member 40. As a result, it is possible to coaxially dispose the gear member 34, the string 18 and the spiral spring 30. Therefore, there is no gap in the axes among the gear member 34, the string 18 and the spiral spring 30, and the damper unit 16 can be assembled with a high precision.

Also, the core member 40 is formed in the cylindrical shape. The string 18 is wound around the outer peripheral surface of the core member 40, and the spiral spring 30 is wound around the outer peripheral surface of the boss 26 inside the core member 40. Therefore, when compared with a case that, for example, the string 18 and spiral spring 30 are wound around the outer peripheral surface of the core member 40, it is possible to shorten a length of the core member 40. Therefore, it is possible to reduce a wall thickness of the damper unit 16 and make the damper unit 16 compact.

Further, as shown in FIGS. 3 and 5, the notch 58 is formed on the outer wall of the case 20 positioned in the vicinity of the hole portion 52A through which the string 18 passes, and the string 18 is wound around the roller member 64 fixed in the notch 58. Therefore, when the string 18 is pulled out from the case 20, it is possible to adjust the direction of the string 18 through the roller member 64, thereby making the attaching direction of the damper unit 16 flexible.

Also, as shown in FIG. 4, the glove box main portion 12 is rotated around a supporting point 66. Therefore, when the string 18 is wound around the roller member 64, it is possible to open the glove box main portion 12 smoothly. Further, as an opening angle of the glove box main portion 12 increases, a winding angle of the string 18 around the roller member 64 also increases. Therefore, it is possible to increase the sliding friction and obtain the damper effect.

Further, when the gear member 34 is rotated in the pulling out direction of the string 18 shown in FIG. 2, the spiral spring 30 is wound as the gear member 34 is rotated to reduce the diameter, so that the outer peripheral surface of the boss 26 is tightened to accumulate the elastic force. Therefore, when the glove box main portion 12 is closed, it is possible to wind the pulled-out string 18 around the boss 26 by the restoring force of the spiral spring 30.

In this case, the rotary damper 54 may be formed of a one-way damper, and the rotational force of the gear member 34 is damped when the gear member 34 is rotated in the pulling out direction of the string 18. Accordingly, when the glove box main portion 12 is opened, the damper effect can be obtained, so that the string 18 can be slowly pulled out, and the glove box main portion 12 can be slowly opened. Also, when the glove box main portion 12 is closed, the damper does not function. Therefore, the friction in the closing direction of the glove box main portion 12 decreases, so that the glove box main portion 12 can be closed with a further smaller force.

Incidentally, in the present embodiment, the case 20 constituting the damper unit 16 is provided on the car-body side and the string 18 constituting the damper unit 16 is fixed on the glove box main portion 12 side. Alternatively, the case 20 may be disposed on the glove box main portion 12 side, and the string 18 may be fixed on the car-body side.

Also, in the present embodiment, the core member 40 of the gear member 34 is formed in the cylindrical shape and the spiral spring 30 is wound around the outer peripheral surface of the boss 26 in the core member 40. Alternatively, it is also possible to make the core member 40 longer and wind the string 18 and the spiral spring 30 around the outer peripheral surface of the core member 40. Further, the roller member 64 is not necessarily provided, and may be omitted depending on an arrangement of the gear member 34 and the like.

Also, in the present embodiment, the glove box main portion has been explained. However, the present invention is not limited thereto, and can be applied to anything having a pull-out member. Also, the pulling out direction may be not only a rotational movement but also a linear movement. Therefore, the present invention may be applied to a cup holder, an ashtray and the like used in a compartment of a vehicle.

The present invention has the structure as described above. According to the first aspect of the invention, it is possible to dispose the gear, string and spring coaxially. Therefore, there is no gap in the axes among the gear, string and spring, and it is possible to assemble the damper unit with a high precision. Also, when the string is pulled out, the rotary damper engaging the gear damps the rotational force of the gear. Therefore, the string is not vigorously pulled out. Further, when the gear is rotated in the direction in which the string is pulled out, the elastic force is accumulated to the spring in accordance with the rotation of the gear. Therefore, when the pulled-out string is returned to the original state, the string can be wound around the core member by the restoring force of the spring.

According to the second aspect of the invention, when the string is pulled out, the one-way damper is operated to thereby slowly pull out the string, and when the string is returned, the one-way damper is not operated to smoothly return the string.

According to the third aspect of the invention, it is possible to reduce the wall thickness of the damper unit and make the damper unit compact. According to the fourth aspect of the invention, when the string is pulled out, the elastic force is accumulated in the spiral spring, and the spiral spring tightens the boss. Thus, the sliding friction is generated between the spiral spring and the outer peripheral surface of the boss, so that the damper effect by the spiral spring can be obtained.

According to the fifth aspect of the invention, when the string is pulled out from the case, it is possible to adjust the direction of the string through the guiding member, thereby making the attaching direction of the damper unit flexible.

According to the sixth aspect of the invention, even when the free end of the string is fixed to the opening-closing member rotating around the supporting point, it is possible to open the opening-closing member smoothly. Also, as the opening angle of the opening-closing member increases, the wind-up angle of the string winding around the roller member increases, thereby increasing the sliding friction and obtaining the damper effect by the string 18.

According to the seventh aspect of the invention, when the glove box is opened, the damping force of the rotary damper acts to thereby slowly open the glove box main portion and provide high quality feeling. Also, with the one-way damper, when the glove box is closed, the glove box can be closed with a small force by allowing the damping force not to act through the rotary damper.

While the invention has been explained with reference to the specific embodiments of the invention, the explanation is illustrative and the invention is limited only by the appended claims.

What is claimed is:

1. A damper unit comprising:
   a casing having an exit;
   a gear rotatably housed in the casing and having a core member projecting at an axial center thereof;
   a string wound around the core member of the gear and extending outside the casing through the exit;
   a rotary damper disposed in the casing and engaging the gear for damping a rotational force of the gear; and
   a spring disposed in the casing and having one end fixed to the casing and the other end fixed to the core member of the gear for accumulating an elastic force when the string is pulled out.

2. A damper unit as claimed in claim 1, wherein said rotary damper is a one-way damper for damping the rotational force of the gear only when the gear is rotated in a direction that the string is pulled out.

3. A damper unit as claimed in claim 1, wherein said core member includes a cylindrical portion, on which the string is wound, and said casing includes a boss inserted into the cylindrical portion, said one end of the spring being fixed to the boss projecting from the casing and the other end being fixed to an inner peripheral surface of the cylindrical portion.

4. A damper unit as claimed in claim 3, wherein said spring is a spiral spring so that when the string is pulled out, the cylindrical portion is rotated to allow the spiral spring to tighten the boss.

5. A damper unit as claimed in claim 1, further comprising a guiding member provided at the exit of the casing for guiding the string.

6. A damper unit as claimed in claim 5, wherein said guiding member is a roller.

7. A glove box device to be attached to a vehicle body comprising a glove box main portion, and the damper unit as claimed in claim 1 fixed to one of the glove box main portion and the vehicle body, said string having one end fixed to the other of the glove box main portion and the vehicle body.

* * * * *